United States Patent
Broadwater

(10) Patent No.: US 12,427,689 B2
(45) Date of Patent: Sep. 30, 2025

(54) TRIM TOOL WITH ADJUSTABLE TRIM CENTERS

(71) Applicant: Fabri-Kal LLC, Kalamazoo, MI (US)

(72) Inventor: John Broadwater, Kalamazoo, MI (US)

(73) Assignee: Fabri-Kal LLC, Kalamazoo, MI (US)

( * ) Notice: Subject to any disclaimer, the term of this patent is extended or adjusted under 35 U.S.C. 154(b) by 1058 days.

(21) Appl. No.: 17/399,425

(22) Filed: Aug. 11, 2021

(65) Prior Publication Data
US 2023/0051517 A1    Feb. 16, 2023

(51) Int. Cl.
*B26F 1/44* (2006.01)
*B29C 51/44* (2006.01)
*B29L 31/00* (2006.01)

(52) U.S. Cl.
CPC .............. *B26F 1/44* (2013.01); *B29C 51/445* (2013.01); *B26F 2001/4427* (2013.01); *B26F 2001/4463* (2013.01); *B29C 2793/0009* (2013.01); *B29C 2793/009* (2013.01); *B29L 2031/7132* (2013.01); *B29L 2031/7162* (2013.01)

(58) Field of Classification Search
CPC ... B29C 51/445; B26F 1/14; B26F 2001/4463
See application file for complete search history.

(56) References Cited

U.S. PATENT DOCUMENTS

| | | | | |
|---|---|---|---|---|
| 3,826,170 A | * | 7/1974 | Jones | B26D 7/2614 83/698.21 |
| 4,022,089 A | * | 5/1977 | Bulso, Jr. | B23D 31/001 83/124 |
| 4,161,382 A | * | 7/1979 | Padovani | B29C 59/007 425/304 |
| 4,164,076 A | * | 8/1979 | Carrigan | B23Q 3/103 269/900 |
| 4,442,064 A | | 4/1984 | Myers et al. | |
| 4,633,745 A | | 1/1987 | Asano | |
| 5,238,632 A | * | 8/1993 | Watters | B29C 51/261 264/522 |

(Continued)

FOREIGN PATENT DOCUMENTS

EP    3556536 A1 * 10/2019 ............. B29C 51/10
WO    90/11881 A1    10/1990

OTHER PUBLICATIONS

Tools Factory: Machinery for the Plastics Industry; http://toolsfactory.pl/en/toolsfactory/wp-content/uploads/2016/03/Catalog-2016-ANG.pdf; Mar. 2016.

*Primary Examiner* — Benjamin A Schiffman
(74) *Attorney, Agent, or Firm* — Baker Botts L.L.P.

(57) ABSTRACT

A thermoforming trim tool which comprises a punch side and a die side. The punch side moves to the die side in order to trim molded articles from a heated thermoforming sheet that is disposed therebetween. While the punch side of the tool comprises a plurality of punches, the die side of the tool comprises a plurality of dies, and both the punches and the dies are engaged with upper mount plates. Each of the upper mount plates is engaged with a lower mount plate via one or more location keys. Each of the location keys is configured to provide that the upper mount plates are shifted a pre-determined distance relative to the lower mount plate, thereby providing trim centers which are adjusted to account for pre-determined shrinkage in the sheet.

16 Claims, 13 Drawing Sheets

(56) References Cited

U.S. PATENT DOCUMENTS

| | | | |
|---|---|---|---|
| 5,795,535 A | 8/1998 | Giovannone et al. | |
| 5,983,765 A * | 11/1999 | Sandford | B26D 7/2614 |
| | | | 83/681 |
| 6,578,402 B2 * | 6/2003 | Weil | B21D 24/16 |
| | | | 83/194 |
| 6,658,978 B1 * | 12/2003 | Johnson | B26F 1/44 |
| | | | 83/697 |
| 6,722,237 B2 * | 4/2004 | Irwin | B26D 7/01 |
| | | | 83/228 |
| 7,131,360 B2 * | 11/2006 | Irwin | B29C 51/445 |
| | | | 100/269.18 |
| 9,796,103 B2 * | 10/2017 | Durst | B26D 7/2628 |
| 11,034,077 B2 * | 6/2021 | Devlin | B29C 51/445 |
| 11,123,915 B2 * | 9/2021 | Vantrease | B29C 51/38 |
| 11,433,591 B2 * | 9/2022 | Eickhoff | B29C 51/268 |
| 2003/0061924 A1 | 4/2003 | Sofronie et al. | |
| 2006/0096431 A1 * | 5/2006 | Kapolnek | B26D 7/2614 |
| | | | 83/346 |
| 2007/0039436 A1 * | 2/2007 | May, II | B26F 1/44 |
| | | | 83/13 |
| 2015/0210030 A1 | 7/2015 | Bartoli et al. | |
| 2017/0129159 A1 | 5/2017 | Devlin et al. | |
| 2020/0247034 A1 | 8/2020 | Eickhoff et al. | |

* cited by examiner

TRIM TOOL WITH ADJUSTABLE TRIM CENTERS

BACKGROUND

The present invention generally relates to thermoforming trim tools and methods, and more specifically relates to a thermoforming trim tool with adjustable trim centers and a method of adjusting the trim centers of a thermoforming trim tool.

Currently, thermoforming is used to make many different plastic articles (such as food containers, etc.). Thermoforming typically provides that a thermoplastic sheet is heated. Then, multiple articles are molded into the heated sheet. Subsequently, the molded articles are trimmed to separate them from each other. In the time between molding the articles and trimming the articles, the heated sheet decreases in temperature causing shrinkage. This shrinkage creates challenges in terms of accurately trimming the articles because one cannot just assume that the molded articles have not changed their distances relative to each other since the time they were molded.

Typically, the thermoform press forms a plurality of molded articles in the sheet material in various rows. Subsequently, the trim press trims the molded articles as indexed into the trim press. Care must be taken to accurately position each row of the thermoformed articles in the trim press, in order to insure accurate centering of the molded article prior to trimming. Inaccuracy in the trimming step may lead to defects in the finished (i.e., trimmed and molded) articles, increased waste, etc.

To minimize the amount of time between the forming step and the trimming step, thermoforming is often performed using an in-line system wherein a thermoplastic sheet material is provided via a sheet extrusion system. As the extruded sheet travels through a reheating station (thermoformer oven) which reheats the thermoplastic sheet material for forming. From the heating station (thermoformer oven), the heated sheet travels to a press/form station. At the press/form station, platens, form air, and a vacuum are used to form molded articles in the heated sheet material. From the press/form station, the sheet (with the articles molded therein) travels to a trim press (either vertical or horizontal) where the molded articles are trimmed.

Even in an in-line thermoforming method, despite not much time elapsing from the time articles are molded in the press station to when the molded articles are trimmed in the trim station, the temperature of the heated thermoplastic sheet still decreases and shrinks as the sheet moves from the molding station to the trim station. Again, this shrinkage that takes places between the two steps creates challenges in terms of being able to trim accurately the molded articles.

This shrinkage is not predictable due to many factors. For example, some plastic materials shrink more than others, and some plastic materials have irregular shrinkage rates depending on their prior history and chemical structure and treatment. The bottom line is the accuracy of the trimmed products depends upon the type of materials and their shrink characteristics. The molded shot typically exhibits two types of shrink behaviors—one in the form of "smile" from front and back of the molded shot and "hour-glassing" for the sides of the molded shot. These two behaviors mainly cause the "off-trim" condition. Materials that shrink the least amount (such as APET, PLA) tend to have less of the "off-trim" issue while other materials (such as PE and PP) shrink significantly more, causing larger variance in the "expected" and "actual" locations.

Since the thermoplastic sheet (along with molded articles thereon) continues to shrink while being transported to the trim station, the accuracy of the trimmed part is dependent on the amount of the actual shrinkage that takes place. The variance in the actual shrinkage and expected shrinkage (usually estimated/calculated based on type of material and its behavior—referred to as "centerline shrink" in both X and Y direction) determines how "off" the article is trimmed out of the "expected" location in space.

SUMMARY

One object of an embodiment of the present invention is to provide a new and improved trim tool and thermoforming method in order to be able to accurately align and trim thermoformed articles in a sheet material.

Another object of an embodiment of the present invention is to provide a trim tool with adjustable trim centers.

Another object of an embodiment of the present invention is to provide a thermoforming method wherein the trim centers of the trim tool are adjustable to account for shrinkage in the sheet material.

Briefly, an embodiment of the present invention provides a thermoforming trim tool which comprises a punch side and a die side. In operation, the punch side moves to the die side in order to trim molded articles from a sheet that is disposed therebetween. While the punch side of the tool comprises a plurality of punches, the die side of the tool comprises a plurality of dies, and both the punches and the dies are engaged with upper mount plates. Each of the upper mount plates is engaged with a lower mount plate via one or more location keys. Each of the location keys is configured to provide that the upper mount plates are shifted a pre-determined distance relative to the lower mount plate, thereby providing trim centers which are adjusted to account for pre-determined shrinkage in the sheet.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DESCRIPTION

Figure 1:
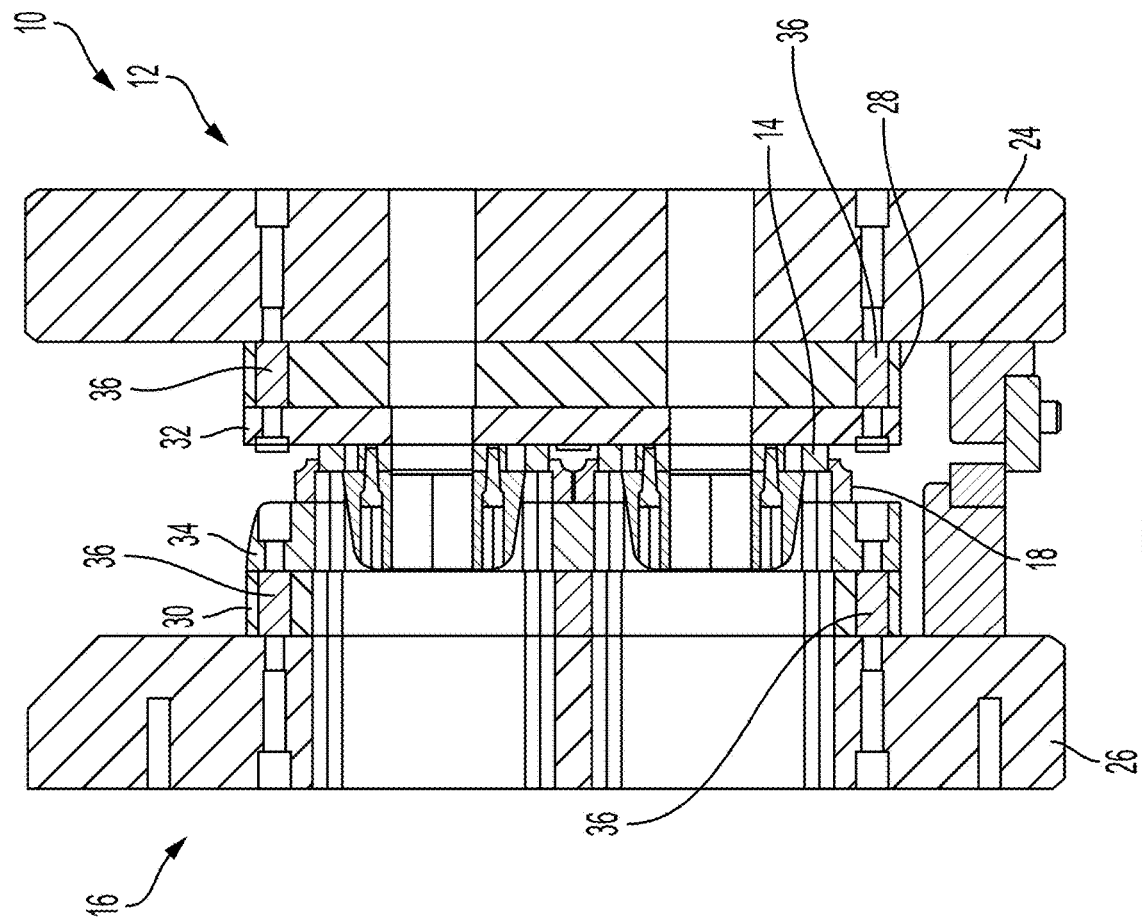
FIG. 1 is a cross-sectional view of a thermoforming trim tool which is in accordance with an embodiment of the present invention.

While this invention may be susceptible to embodiment in different forms, there is shown in the drawings and will be described herein in detail, a specific embodiment with the understanding that the present disclosure is to be considered an exemplification of the principles of the invention and is not intended to limit the invention to that as illustrated.

FIG. 1 is a cross-sectional view of a thermoforming trim tool 10 which is in accordance with an embodiment of the present invention. The thermoforming trim tool 10 comprises a punch side 12 which includes punches 14, and a die side 16 which includes corresponding dies 18. In operation, the punch side 12 moves toward the die side 16, causing the punches 14 to engage the dies 18, resulting in the thermoforming trim tool 10 trimming molded articles 20 from a heated thermoforming sheet 22 that is disposed therebetween. Each side 12, 16 comprises a shoe 24, 26, and a mount plate 28, 30 is connected to each of the shoes 24, 26. The embodiment shown in FIG. 1 provides that the mount plate 28, 30 (hereinafter the "lower mount plate") that is connected to the shoe 24, 26 includes a plurality of mount plates 32, 34 (hereinafter "upper mount plates") engaged therewith. While the lower mount plate 28, 30 is connected to the corresponding shoe 24, 26, each of the upper mount plates 32, 34 is not only connected to the lower mount plate 28, 30 but is also engaged with either punches 14 (i.e., if on the punch side 16 of the tool 10) or dies 18 (i.e., if on the die side 16 of the tool 10).

Each of the upper mount plates 32, 34 is positioned relative to the lower mount plate 28, 30 via one or more location keys 36. The location keys 36 are configured to provide that the upper mount plates 32, 34 are shifted a pre-determined distance relative to the lower mount plate 28, 30, thereby providing trim centers which are adjusted in order to account for shrinkage in the sheet 22, preferably shrinkage that has been predicted based on existing data and/or measurements taken previously.

Figure 2:
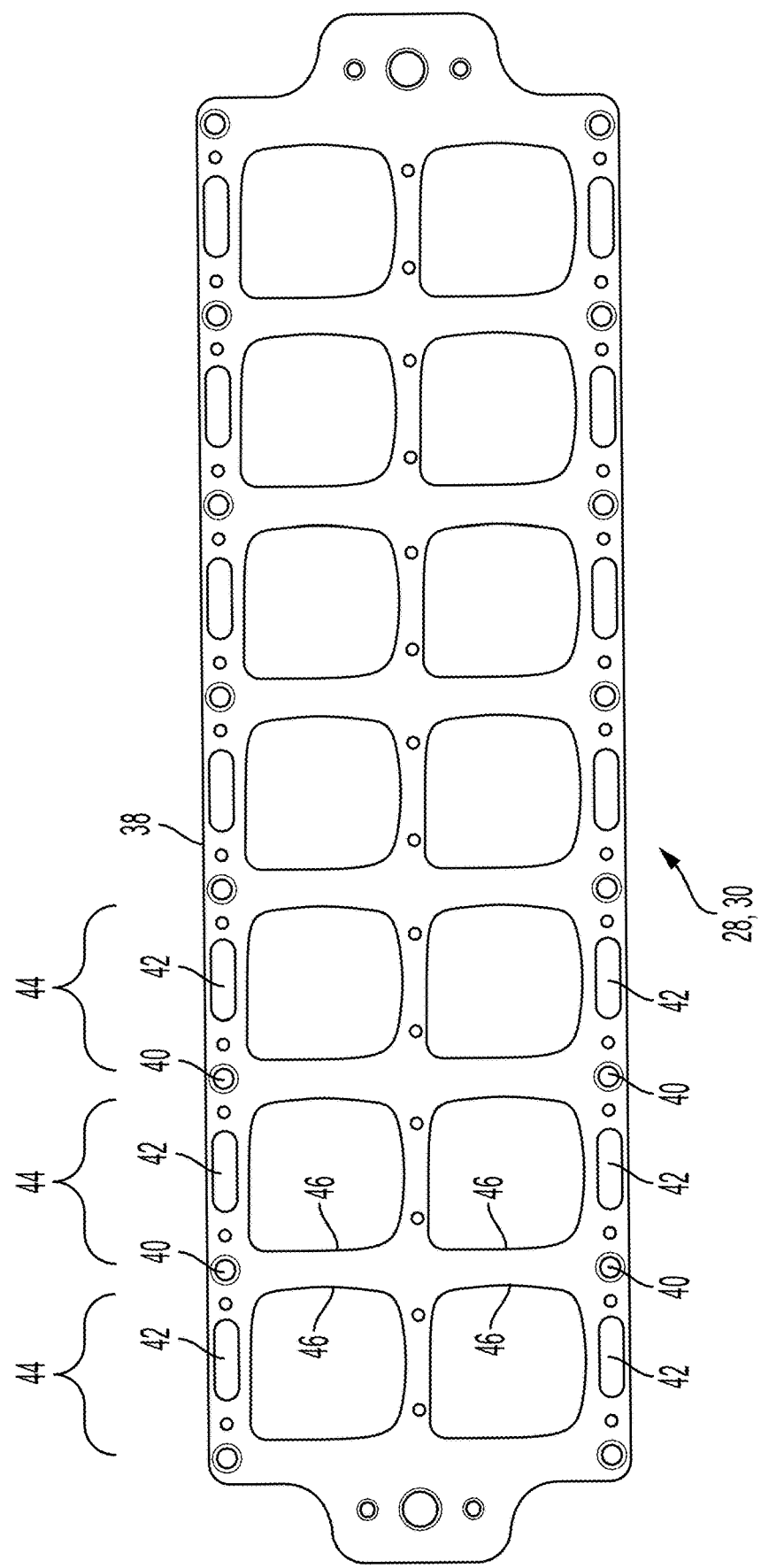
FIG. 2 is a top view of a lower mount plate.
Figure 3:
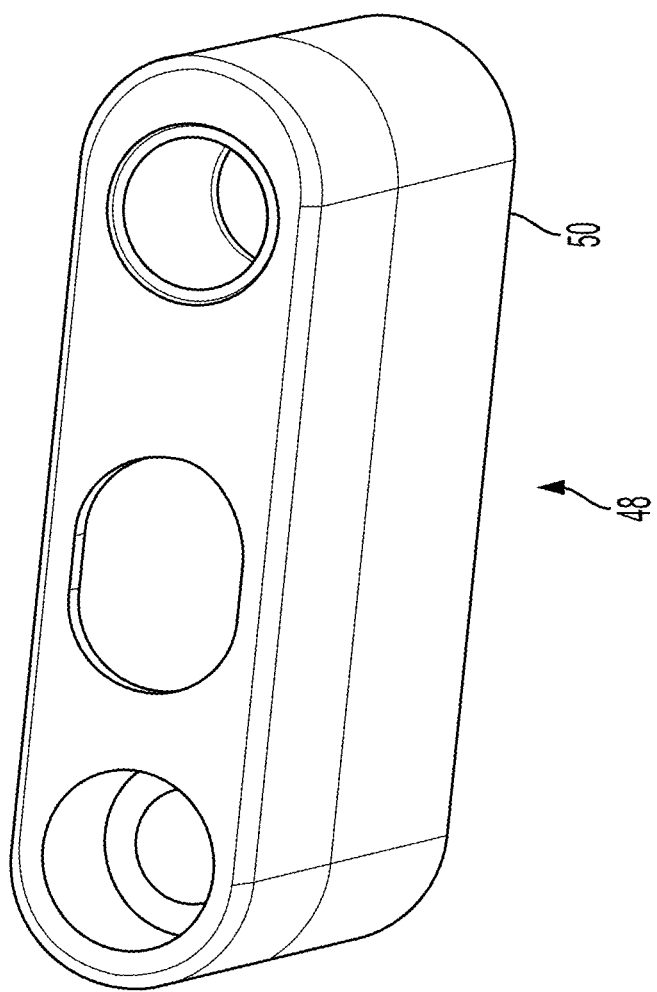
FIG. 3 is a perspective view of a location key blank.
Figure 4:
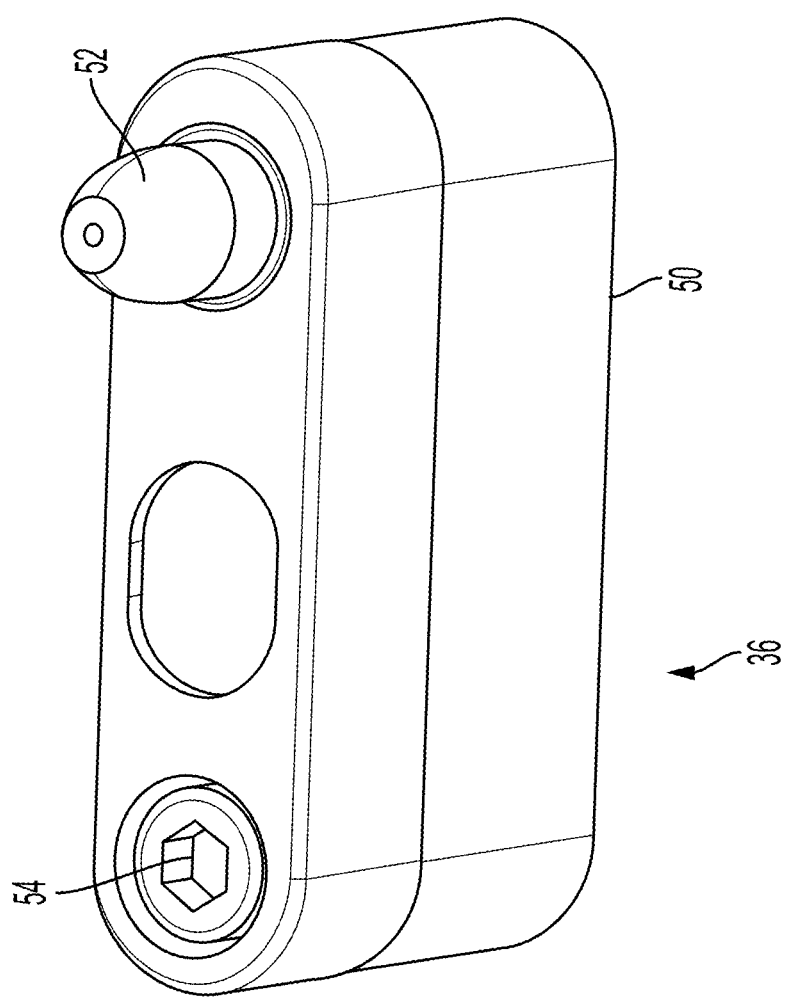
FIG. 4 is similar to FIG. 3, but shows a dowel pin provided on a specific location on the location key in order to provide a desired trim center offset.

FIG. 2 is a top view of the lower die mount plate (could be either 28 or 30). As shown, preferably each of the lower mount plates 28, 30 comprises a metal plate 38 which includes not only a plurality of holes 40 so fasteners can be used to connect the lower mount plate to the corresponding shoe, but also pockets 42 for receiving location keys 36 (such as is shown in FIGS. 3 and 4). Specifically, as shown in FIG. 2, preferably each row 44 has one pocket 42 proximate the top of the row 44 and one pocket 42 proximate the bottom of the row 44. As shown, each upper mount plate 30, 34 (i.e., either the punch side 12 or the die side 16) the lower mount plate 28, 30 is mounted. The die side 16 also preferably includes openings 46 for receiving trim molded articles 20.

FIG. 3 is a perspective view of a location key blank 48. As shown, preferably the location key blank 48 has an outer surface profile or shape 50 which corresponds with the shape of the pockets 42 (see FIG. 2) that are formed in each of the lower mount plates 28, 30. As such, the location key blank 48 can be securely and precisely received by the pocket 42 without sliding back and forth or up and down.

FIG. 4 is like FIG. 3 but shows a pin 52 (such as a dowel pin) provided on a specific location on the location key 36 in order to provide a desired trim center offset. Preferably, the location of the pin 52 on the location key 36 is specifically selected based on existing data and/or measurements taken previously relating to previous runs of the trim tool, in order to take shrinkage into consideration and improve the precision of the trim in terms of the articles 20 molded previously into the sheet 22. As will be described more fully later herein, the pin 52 on the location key 36 gets received by a corresponding hole in an upper mount plate. As shown in FIG. 4, besides being dowel pinned in location via the location keys 36, the location keys 36 are also held down with fasteners 54, such as socket head cap screws. In order to allow for center line adjustability, clearance holes 56 and counter bores 58 (see FIGS. 6 and 7) are slotted to allow for that adjustability.

Figure 5:
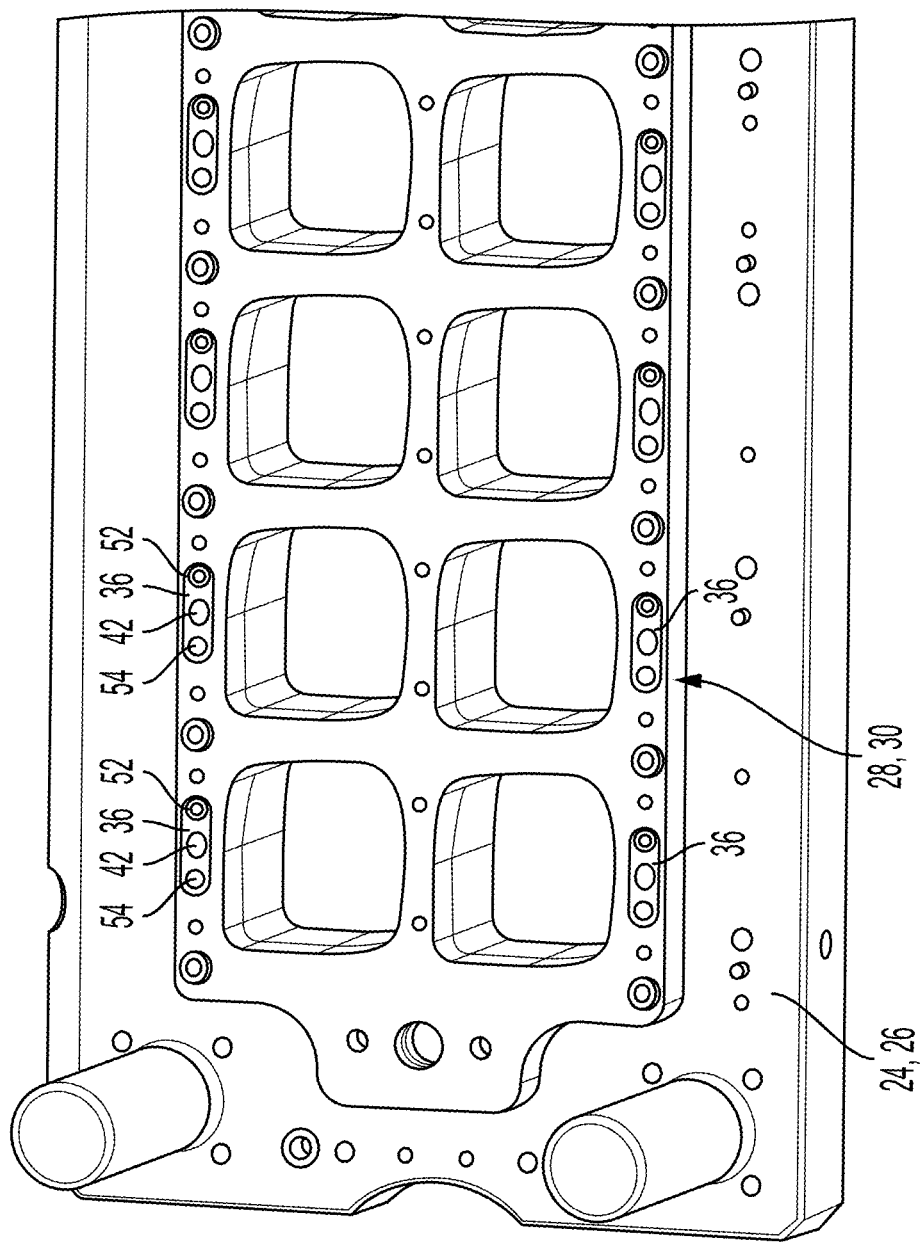
FIG. 5 shows the lower mount plate engaged with a shoe and having location pins thereon.

FIG. 5 shows the lower mount plate (could be 28 or 30) connected to the shoe (could be 24 or 26) and having location keys 36 received in the corresponding pockets 42 in the lower mount plate 28, 30.

Figure 6:
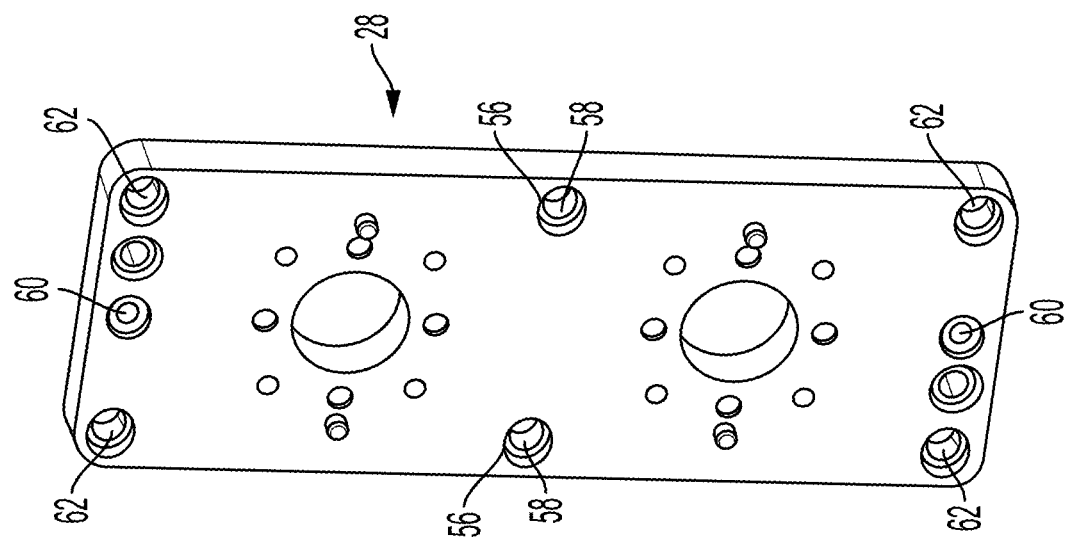
FIG. 6 is a perspective view of an upper mount plate on the punch side.
Figure 7:
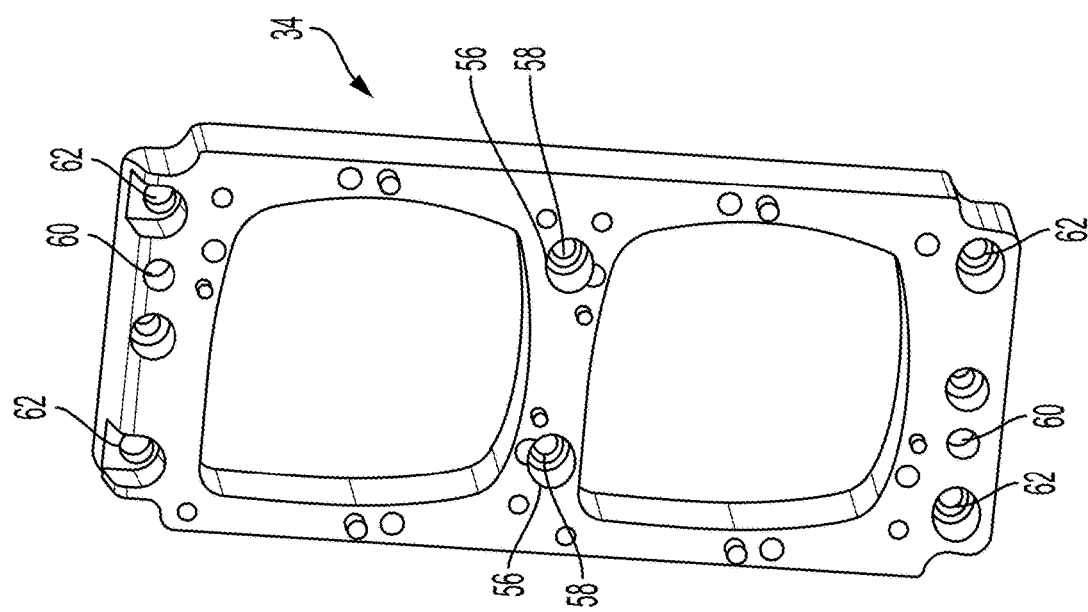
FIG. 7 is a perspective view of an upper mount plate on the die side.

As mentioned above, the pin 52 on the location key 36 gets received by a corresponding hole in an upper mount plate 32, 34. FIG. 6 is a perspective view of an upper mount plate 32 on the punch side 12 while FIG. 7 is a perspective view of an upper mount plate 34 on the die side 16. As shown, regardless of the side, each upper mount plate 32, 34 preferably includes precisely formed holes 60 which are configured to receive the pin 52 of a location key 36. As shown in FIGS. 6 and 7, preferably each upper mount plate 32, 34 also preferably includes slots 62 for receiving fasteners 64 (see, for example, FIGS. 9 and 11) which secure to the lower mount plate 28, 30, said slots 62 configured to allow the upper mount plate 32, 34 to be shifted relative to the lower mount plate 28, 30 before the fasteners 64 get tightened, wherein the amount of the shift is effectively determined by the location of the pin 52 on the location key 36.

While the upper mount plate 28 shown in FIG. 6 relates to the punch side 12 of the tool 10 and is therefore configured to receive punches 14, the upper mount plate 34 shown in FIG. 7 relates to the die side 16 of the tool 10 and is therefore configured to receive dies 18.

Figure 8:
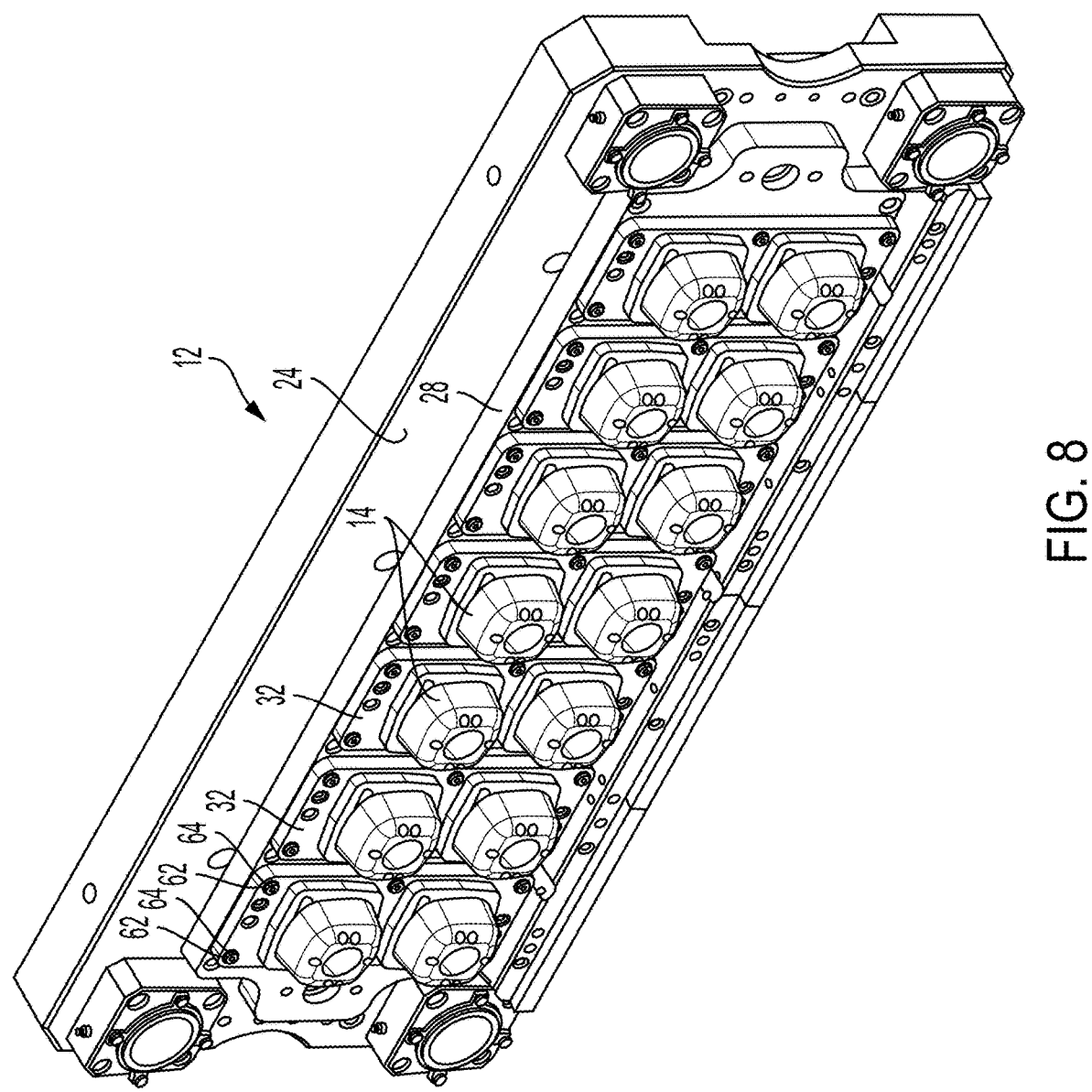
FIG. 8 is a perspective view showing the punch side of the tool.
Figure 9:
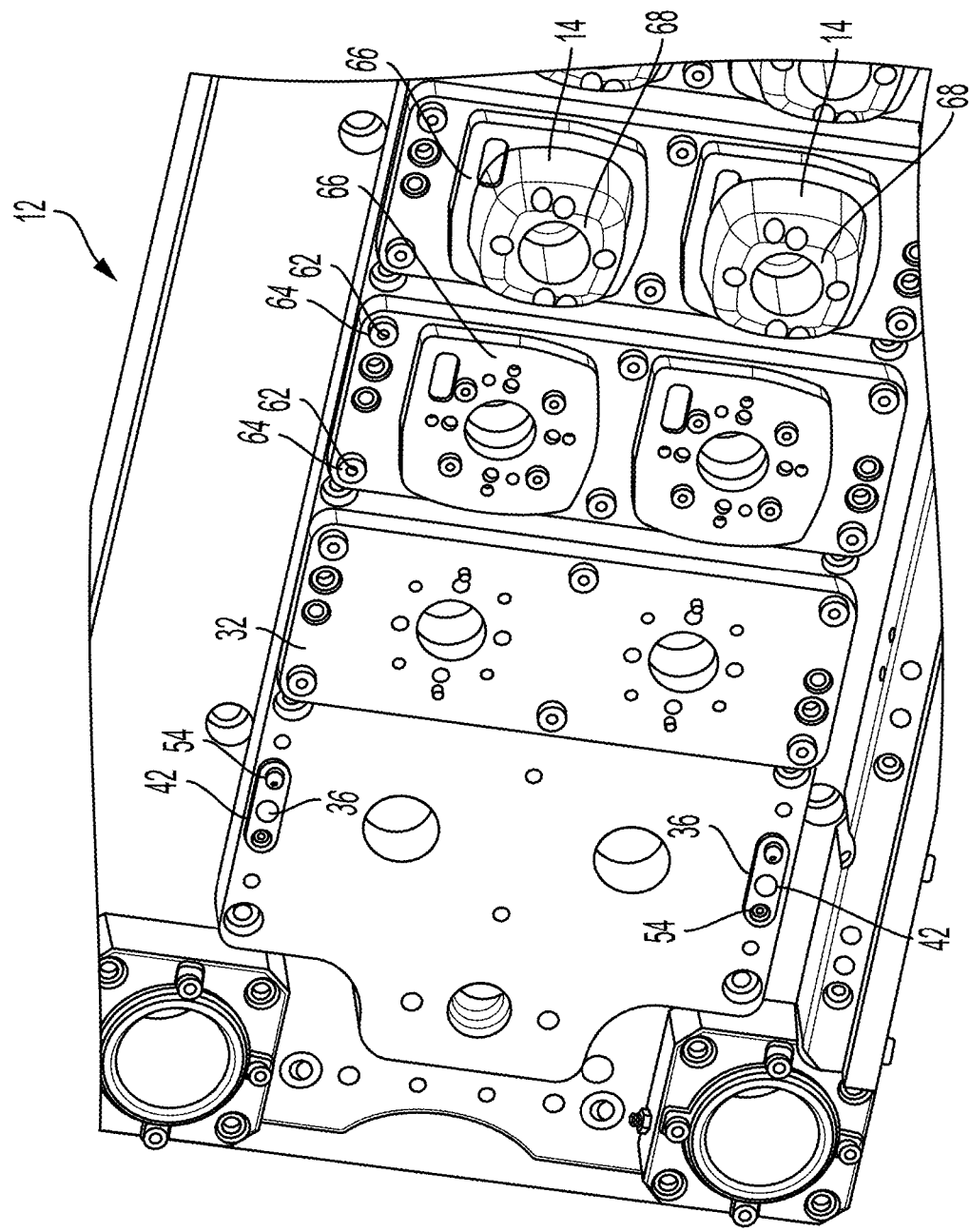
FIG. 9 shows a portion of that which is shown in FIG. 8, enlarged and with certain components omitted.

The punch side 12 of the tool 10 will be described first. FIG. 8 is a perspective view showing the punch side 12 of the tool 10, while FIG. 9 shows a portion of that which is shown in FIG. 8, enlarged and with certain components omitted. As shown, the lower mount plate 28 is connected to the shoe 24, and the upper mount plates 32 are connected to the lower mount plate 28. Each upper mount plate 32 is connected to the lower mount plate 28 with fasteners 54 that extend through the slots 62 in the upper mount plate 32. The fact that it is slots 62 through which the fasteners 54 extend (i.e., instead of holes) allows the upper mount plate 32 to be shifted relate to the lower mount plate 28 before the fasteners 54 are tightened. As shown on the left side of FIG. 9, before the upper mount plate 32 is mounted on the lower mount plate 28, the location keys 36 (with their pins 52 located in a precise location on the location pin 36 to provide a desired offset) are positioned in the pockets 42 in the lower mount plate 28. Once an upper mount plate 32 is secured to the lower mount plate 28, punches 14 are secured to the upper mount plates 28. As shown, each punch 14 may comprise a base plate 66 that gets secured to the upper mount plate 32, and then a punch element 68 is secured to the punch base plate 66.

Figure 10:
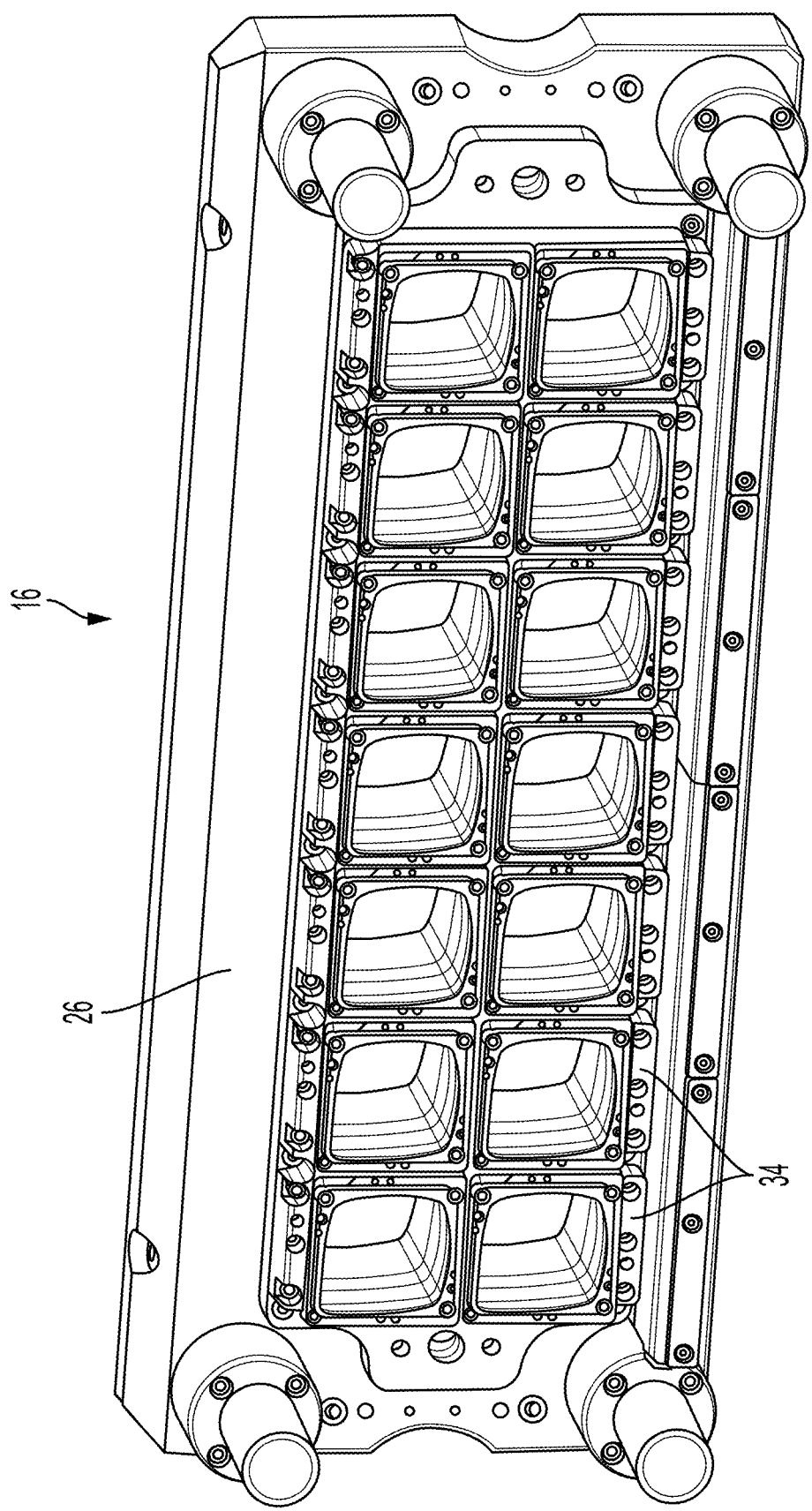
FIG. 10 is a perspective view showing the die side of the tool.
Figure 11:
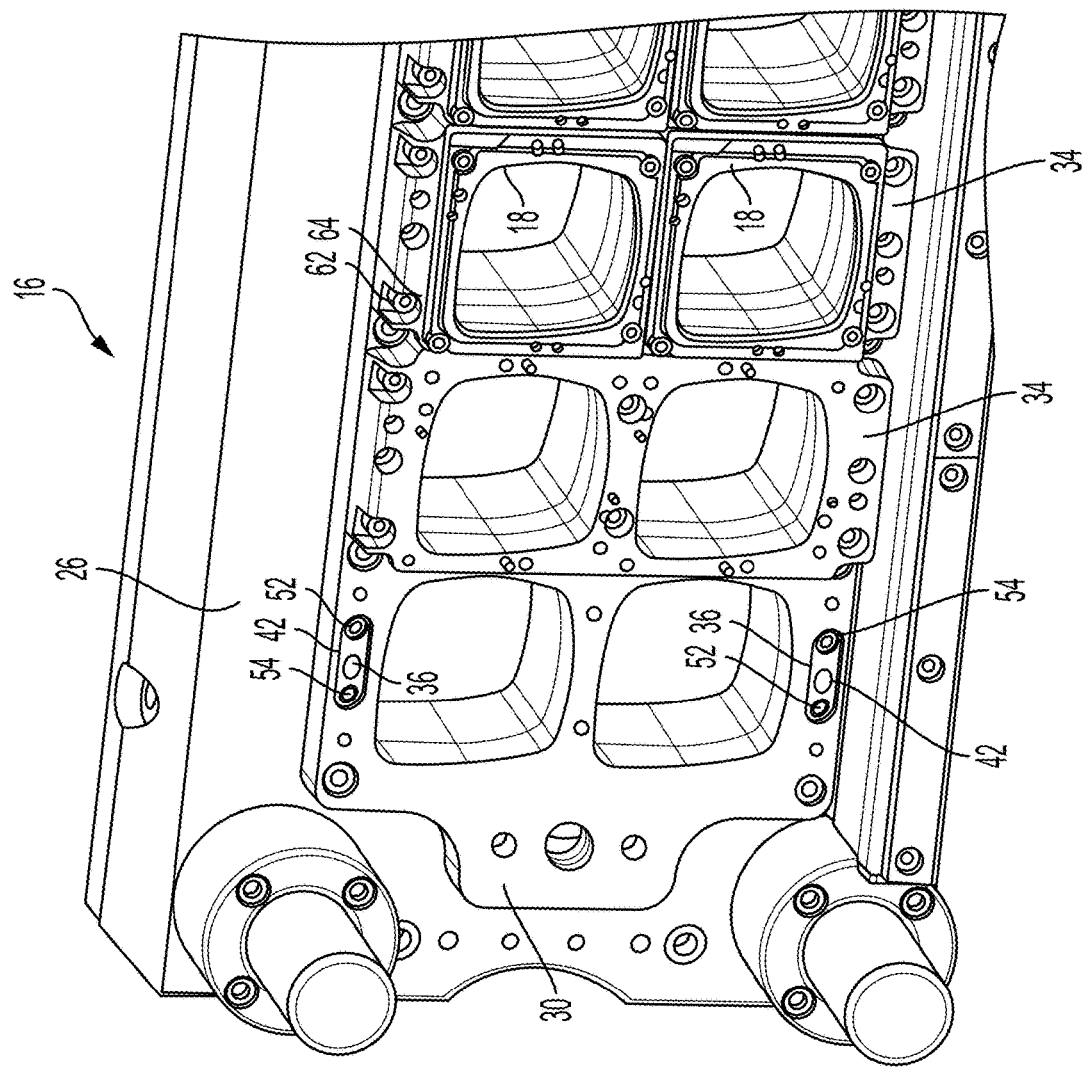
FIG. 11 shows a portion of that which is shown in FIG. 10, enlarged and with certain components omitted.

FIG. 10 is a perspective view showing the die side 16 of the tool 10, while FIG. 11 shows a portion of that which is shown in FIG. 10, enlarged and with certain components omitted. As shown, the lower mount plate 30 is connected to the shoe 26, and the upper mount plates 34 are connected to the lower mount plate 30. Each upper mount plate 34 is connected to the lower mount plate 30 with fasteners 54 that extend through the slots 62 in the upper mount plate 34. The fact that it is slots 62 through which the fasteners 54 extend (i.e., instead of holes) allows the upper mount plate 34 to be shifted relate to the lower mount plate 30 before the fasteners 54 are tightened. As shown on the left side of FIG. 11, before the upper mount plate 34 is mounted on the lower mount plate 30, the location keys 36 (with their pins 52 located in a precise location on the location pin to provide a desired offset) are positioned in the pockets 42 in the lower mount plate 30. Once an upper mount plate 34 is secured to the lower mount plate 30, dies 18 are secured to the upper mount plate 34.

Figure 12:
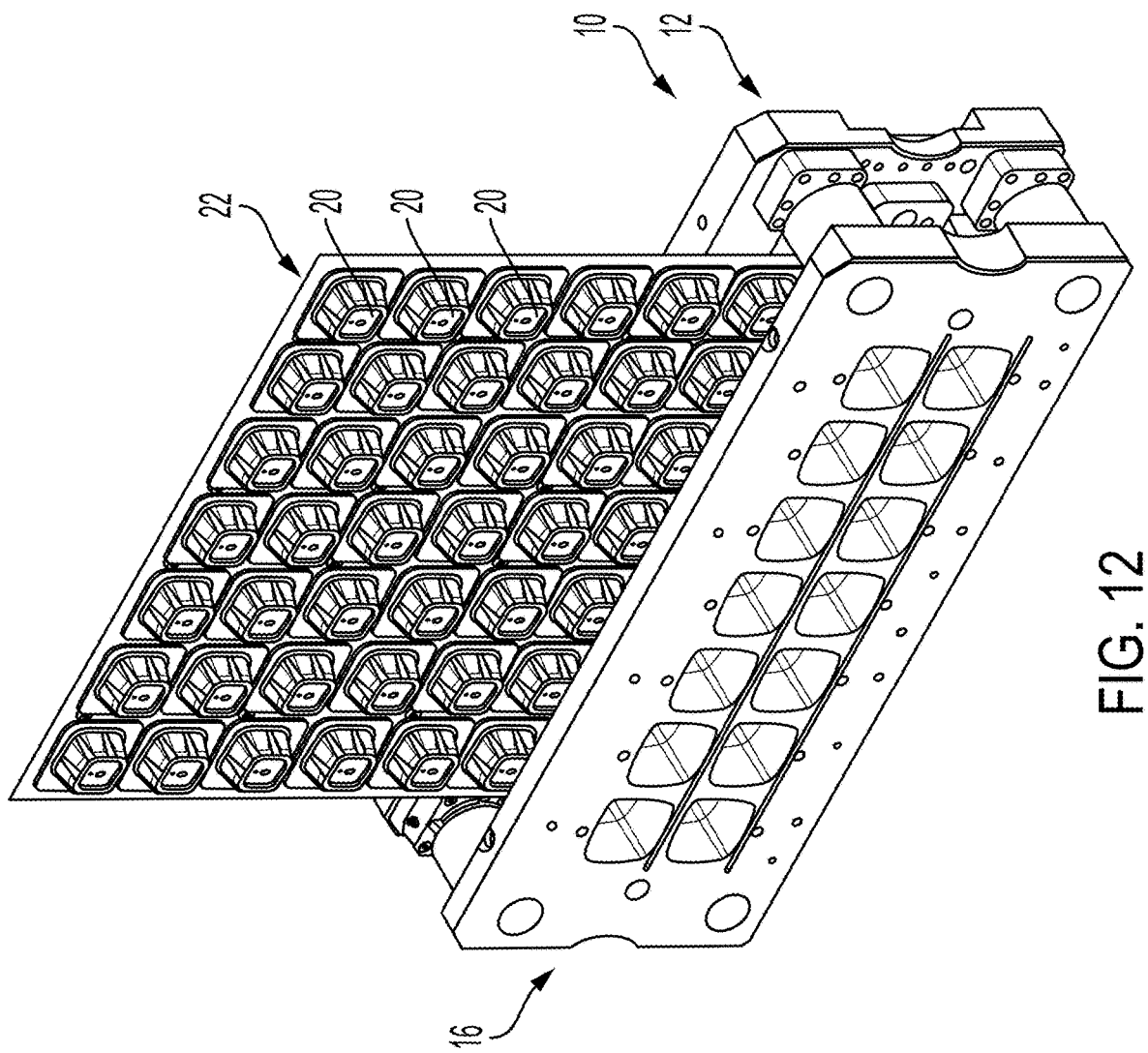
FIG. 12 shows the thermoforming trim tool in action.
Figure 13:
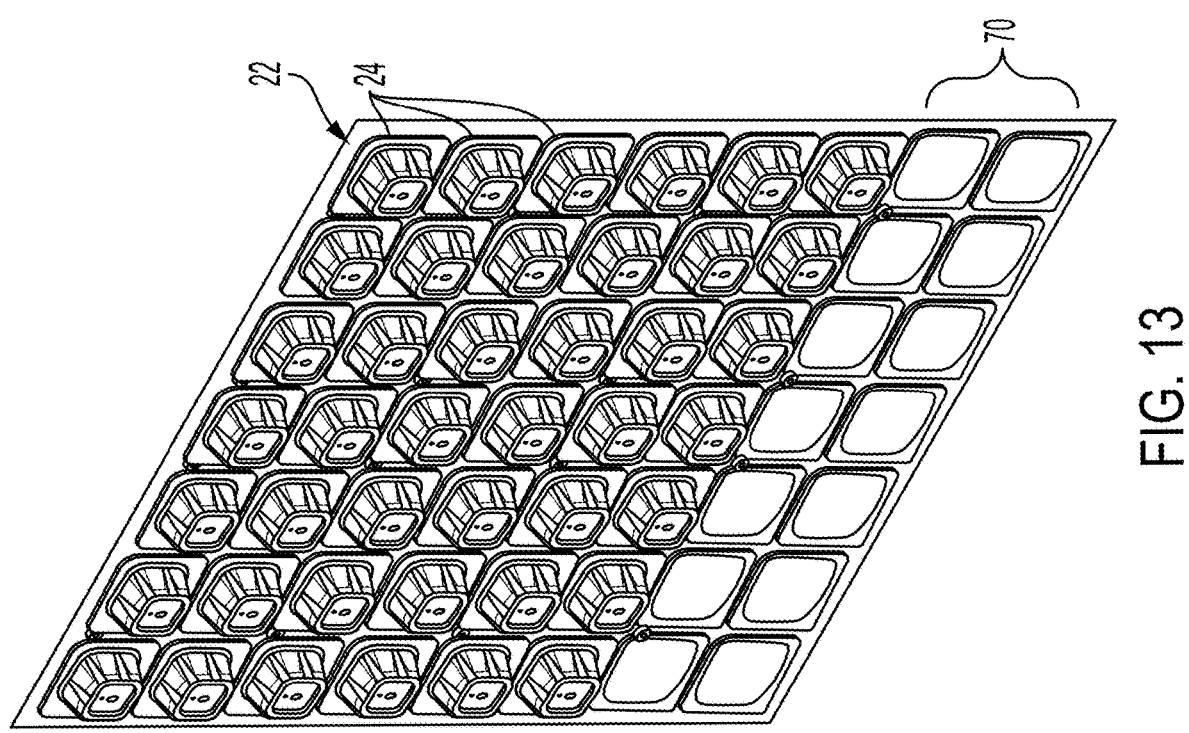
FIG. 13 shows the sheet after the tool has been used to trim two rows of molded articles.

FIG. 12 shows the thermoforming trim tool 10 in action, wherein the punch side 12 has come to the die side 16 in order to trim two rows 70 of molded articles 20 from the sheet 22. FIG. 13 shows the sheet 22 after the tool 10 has been used to trim the two rows 70. Once these two rows are trimmed, the trimming process is repeated after advancing the sheet 22 two rows in the thermoforming trim tool 10 while the tool 10 is open.

The embodiment of the invention described hereinabove provides that the position of the upper mount plates 32, 34 (and therefore the punches 14 and the dies 18) relative to the lower mount plates 28, 30 can be precisely adjusted by placing the pins 52 on the location keys 36 at precise locations on the location key 36. This allows for a desired offset in the trim centers when the molded articles 20 are trimmed from the sheet 22.

In terms of a method, a method in accordance with an embodiment of the present invention comprises providing pins 52 on specific locations on location keys 36, securing lower mount plates 28, 30 to shoes 24, 26 of a thermoforming trim tool 10, inserting the location keys 36 in pockets 42 in the lower mount plates 28, 30, securing upper mount plates 32, 34 to the lower mount plates 28, 30, and ultimately securing punches 14 and dies 18 to the upper mount plates 32, 34. Therefore, the thermoforming trim tool 10 is useable to trim molded articles 20 from a sheet 22 and, while doing so, provide a desired offset with regard to trim centers.

While a specific embodiment of the invention has been shown and described, it is envisioned that those skilled in the art may devise various modifications without departing from the spirit and scope of the present invention.

What is claimed is:

1. A thermoforming trim tool for trimming molded articles from sheet, said thermoforming trim tool comprising: a shoe; a lower mount plate engaged with the shoe; location keys engaged with the lower mount plate; pins on the location keys at locations on the location keys selected to provide desired offsets with regard to trim centers of the thermoforming trim tool; upper mount plates secured to the lower mount plate, said upper mount plates comprising holes which receive the pins on the location keys.

2. A thermoforming trim tool as recited in claim 1, said lower mount plate comprising pockets, wherein the location keys are in the pockets.

3. A thermoforming trim tool as recited in claim 2, wherein a shape of the pockets in the lower mount plate correspond with a shape of the location keys.

4. A thermoforming trim tool as recited in claim 1, said upper mount plates comprising slots which receive fasteners which secure to the lower mount plate.

5. A thermoforming trim tool as recited in claim 4, wherein the slots are configured to provide for shifting necessary for the pins on the location keys to be received in the holes in the upper mount plates before the fasteners are tightened to fix the upper mount plates relative to the lower mount plate.

6. A thermoforming trim tool as recited in claim 1, wherein the pins on the location keys comprise dowel pins.

7. A thermoforming trim tool as recited in claim 1, further comprising at least one of punches and dies on the upper mount plates.

8. A thermoforming trim tool as recited in claim 1, further comprising punches on the upper mount plates.

9. A thermoforming trim tool as recited in claim 1, further comprising dies on the upper mount plates.

10. A thermoforming trim tool for trimming molded articles from sheet, said thermoforming trim tool comprising: a punch side and a die side, wherein each of the punch side and the die side comprises: (i) a shoe, (ii) a lower mount plate engaged with the shoe, (iii) location keys engaged with the lower mount plate, (iv) pins on the location keys at locations on the location keys selected to provide desired offsets with regard to trim centers of the thermoforming trim tool, and (v) upper mount plates secured to the lower mount plate, wherein said upper mount plates comprising holes which receive the pins on the location keys.

11. A thermoforming trim tool as recited in claim 10, said lower mount plate of each of the punch side and the die side comprising pockets, wherein the location keys of each of the punch side and the die side are in the respective pockets.

12. A thermoforming trim tool as recited in claim 10, said upper mount plates of each of the punch side and the die side comprising slots which receive fasteners which secure to the respective lower mount plate.

13. A thermoforming trim tool as recited in claim 12, wherein the slots of each of the punch side and the die side are configured to provide for shifting necessary for the pins on the location keys to be received in the holes in the upper mount plates before the fasteners are tightened to fix the upper mount plates relative to the lower mount plate.

14. A thermoforming trim tool as recited in claim 10, wherein the pins of each of the punch side and the die side on the location keys comprise dowel pins.

15. A thermoforming trim tool as recited in claim 11, wherein a shape of the pockets of each of the punch side and the die side in the lower mount plate correspond with a shape of the location keys.

16. A thermoforming trim tool as recited in claim 10, wherein the punch side comprises punches on the upper mount plates of the punch side and the die side comprises dies on the upper mount plates of the die side.

* * * * *